US008757815B2

(12) United States Patent
Saruwatari et al.

(10) Patent No.: US 8,757,815 B2
(45) Date of Patent: Jun. 24, 2014

(54) LAMP UNIT

(75) Inventors: Naoto Saruwatari, Osaka (JP);
Masanori Gotou, Shiga (JP); Hiroshi Sekido, Aichi (JP); Makoto Hoshino, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 190 days.

(21) Appl. No.: 13/485,925

(22) Filed: Jun. 1, 2012

(65) Prior Publication Data

US 2013/0021807 A1    Jan. 24, 2013

(30) Foreign Application Priority Data

Jun. 1, 2011   (JP) .................................. 2011-123114
May 30, 2012  (JP) .................................. 2012-123401

(51) Int. Cl.
*F21V 21/08*   (2006.01)
*G03B 21/14*   (2006.01)

(52) U.S. Cl.
USPC ............................................ 353/87; 362/254

(58) Field of Classification Search
USPC ............ 353/87, 119; 362/254, 306, 310, 368, 362/372
See application file for complete search history.

(56) References Cited

U.S. PATENT DOCUMENTS

| | | | | |
|---|---|---|---|---|
| 5,860,720 A * | 1/1999 | Negishi et al. | ................ | 353/74 |
| 6,398,367 B1 * | 6/2002 | Watanabe | ................ | 353/98 |
| 7,104,654 B2 * | 9/2006 | Tamaru et al. | ................ | 353/85 |
| 7,258,468 B2 * | 8/2007 | Peng et al. | ................ | 362/362 |
| 8,070,301 B2 * | 12/2011 | Ito | ................ | 353/87 |
| 2004/0233400 A1 * | 11/2004 | Kyoto et al. | ................ | 353/119 |
| 2005/0024601 A1 * | 2/2005 | Morinaga | ................ | 353/87 |
| 2006/0187424 A1 * | 8/2006 | Guo | ................ | 353/119 |

FOREIGN PATENT DOCUMENTS

| | | | |
|---|---|---|---|
| JP | H09-098359 | A | 4/1997 |
| JP | H10-031163 | A | 2/1998 |
| JP | H11-072844 | A | 3/1999 |
| JP | H11-231413 | A | 8/1999 |
| JP | 2007-003633 | A | 1/2007 |
| JP | 2008-176199 | A | 7/2008 |

* cited by examiner

*Primary Examiner* — William C Dowling
(74) *Attorney, Agent, or Firm* — Judge Patent Associates

(57) ABSTRACT

A lamp unit 10 includes a lamp 100, a lamp holder 102/103 for holding the lamp 100, a handle section 108 used when removing the lamp unit 10 from a projector, and a support section 251/252 for supporting the lamp unit 10 from below. The support section 251/252 includes a front side support section 251 for supporting the lamp unit 10 at a front side of the lamp unit 10, and a back side support section 252 that is disposed behind the lamp 100 and is for supporting the lamp unit 10 at a tip thereof located outside an outer circumference of the lamp 100 when the lamp unit 10 is viewed from front.

7 Claims, 15 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

LAMP UNIT

BACKGROUND OF THE INVENTION

1. Field of the Invention

The present invention relates to a lamp unit that functions as a light source of a projector, and, in particular, relates to a lamp unit detachably included in a projector.

2. Description of the Background Art

Lamp units that are detachably included in projectors have been hitherto known. For example, a projector includes: a lamp unit having a light source section; an illumination optical system configured to cause light emitted from the lamp unit to be parallel; an image displaying system configured to modulate parallel beams in accordance with image information and generate image projection light; and a projection optical system having a projection lens for projecting the image projection light onto a screen.

A lamp is used in the light source section. It is necessary to replace the lamp after a certain amount of time, since the brightness of the lamp deteriorates in accordance with the time it has been used. Japanese Laid-Open Patent Publication No. 2008-176199 discloses a light source device that is included in a projector and can be separated from an illumination optical system.

SUMMARY OF THE INVENTION

Since the temperature of a lamp in a lamp unit becomes high while a projector is in use, when it is necessary to replace the lamp unit, ordinarily, the lamp has to be turned off, and a replacement operation has to be conducted after the lamp is confirmed to be sufficiently cold. However, if the lamp breaks or if the illumination intensity of the lamp rapidly decreases while the projector is in use, there is a need to replace the lamp unit immediately; thus, the lamp unit has to be replaced while the lamp is still in a high temperature state.

In such a situation, when removing the lamp unit from the projector, a worker holds a handle section of the lamp unit and pulls out the lamp unit. Then, the lamp unit removed from the projector is placed down on an arbitrarily location by the worker. However, with a hitherto known lamp unit, there has not been any consideration regarding the stability of the lamp unit when it is placed down on a surface after being removed, and the lamp unit may topple backward. If the lamp unit topples backward, the outer circumferential surface of the lamp in the high temperature state makes contact with a placement surface (e.g., surface of a desk), and the placement surface will be exposed to high temperature. For example, when a front side portion of the hitherto known lamp unit is made thin for size-reduction, the lamp unit can topple backward more easily.

In order to solve the above described problem, one nonlimiting and exemplary embodiment of the present invention provides a lamp unit capable of, when replacing a lamp unit, even if a worker removes the lamp unit from a projector and places it down on an arbitrarily location, suppressing occurrence of a situation where a high temperature lamp makes contact with the location where the lamp unit has been placed.

A lamp unit of the present invention is a lamp unit detachably disposed on a projector, and includes: a lamp configured to function as a light source of the projector; a lamp holder configured to hold the lamp; a handle section disposed on the lamp holder and used when removing the lamp unit from the projector; and a support section used for placing down the lamp unit removed from the projector on a surface and is configured to support the lamp unit from below. The support section includes a front side support section configured to support the lamp unit at a front side of the lamp unit, and a back side support section disposed behind the lamp and configured to support the lamp unit at a tip located outside an outer circumference of the lamp when the lamp unit is viewed from the front.

For example, the back side support section may be disposed so as to shield a site having an installation hole for a bulb of the lamp. Furthermore, for example, the support section may be configured to support the lamp unit with three or more protruding sections.

For example, the handle section may be detachable and reattachable with respect to the lamp holder. Furthermore, for example, a lamp lid that is fixed on the lamp holder and that forms one portion of an exterior surface of the projector in a state where the lamp unit is installed in the projector may be further included; and the handle section may be fixed or formed on the lamp lid. Furthermore, for example, the lamp holder may include a holder body configured to hold the lamp and formed from a heat-resistant resin or a metallic material, and an opposing section formed from a heat-resistant resin, extending backward from the holder body and opposing an outer circumferential surface of the lamp. Furthermore, for example, the support section may be configured to support the lamp unit using three or more protruding sections; and at least one of the protruding sections disposed on a holder body of the lamp holder may be configured to also function as a datum pin that is to be inserted in a datum hole disposed on an installation position of the lamp unit of the projector.

When replacing a lamp unit, the lamp unit can be safely replaced even when the lamp is in a high temperature state; since the lamp unit can be placed on a table or the like even while a handle thereof is being held and there is no need to hold any part other than the handle.

These and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments which are one mode of the present invention will be described with reference to the drawings.

First Embodiment

Figure 1:
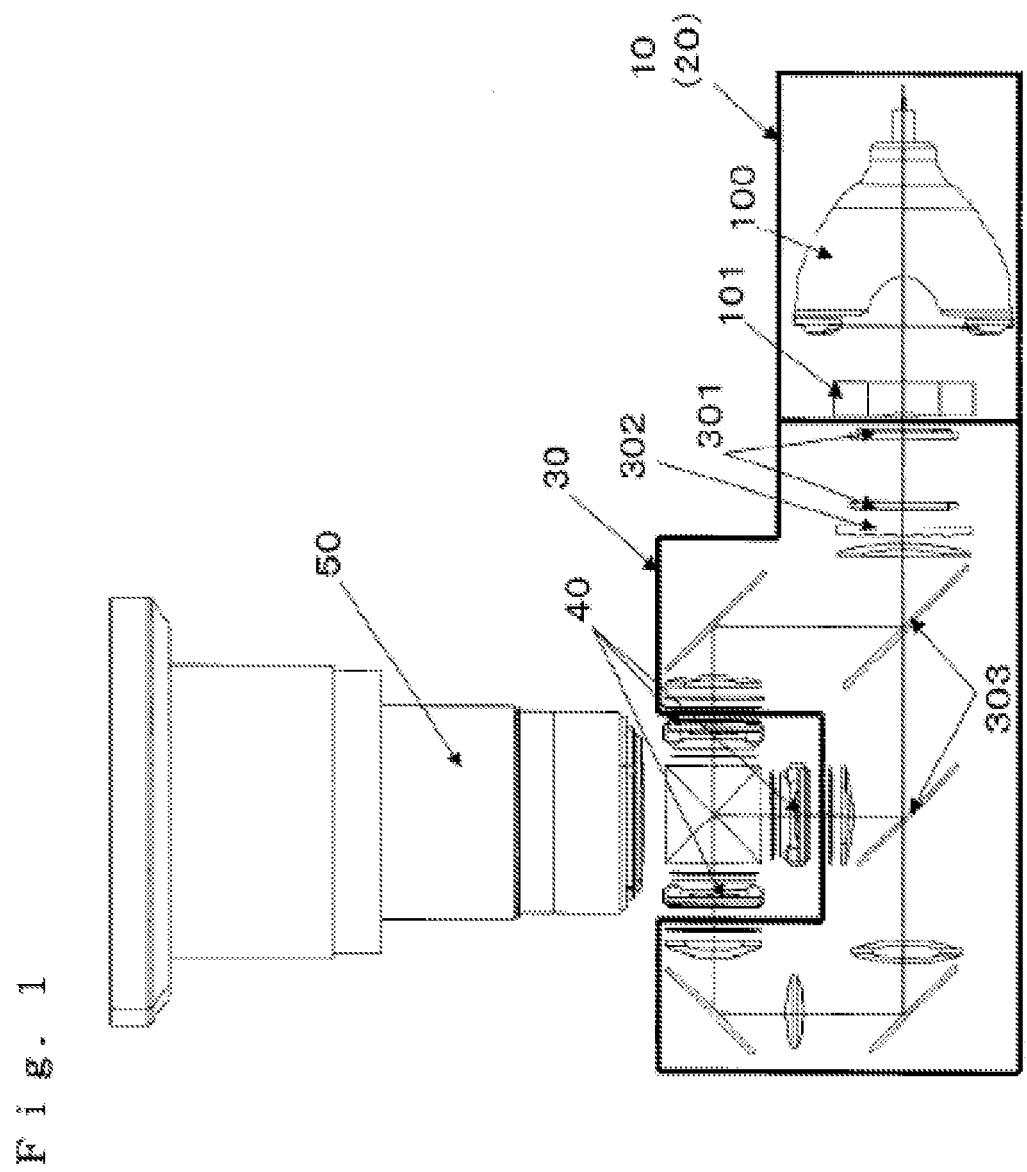
FIG. 1 is a schematic structural diagram of a projector according to an embodiment.

FIG. 1 is a schematic diagram showing a configuration of a projector.

A projector includes: a lamp unit 10 having a lamp 100 (e.g., mercury lamp), etc.; an illumination optical system 30 configured to cause light from the lamp 100 serving as a light source to become parallel beams; an image displaying system configured to modulate the parallel beams from the illumination optical system 30 in accordance with image information and generate image projection light; and a projection optical system configured to project the image projection light onto a screen. In the illumination optical system 30, light projected from the lamp unit 10 is caused to become parallel light by a lens array 301, converted into unidirectional linear polarized light by a polarization conversion element 302, and separated into 3 colors of RGB by a dichroic mirror 303. The image displaying system includes an image formation device 40 that modulates each color of light separated by the illumination optical system 30 in accordance with image information, and forms image projection light. The projection optical system projects an image on the screen through a projection lens 50. The image formation device 40 of the first embodiment is formed from a transmission type liquid crystal panel.

Figure 2:
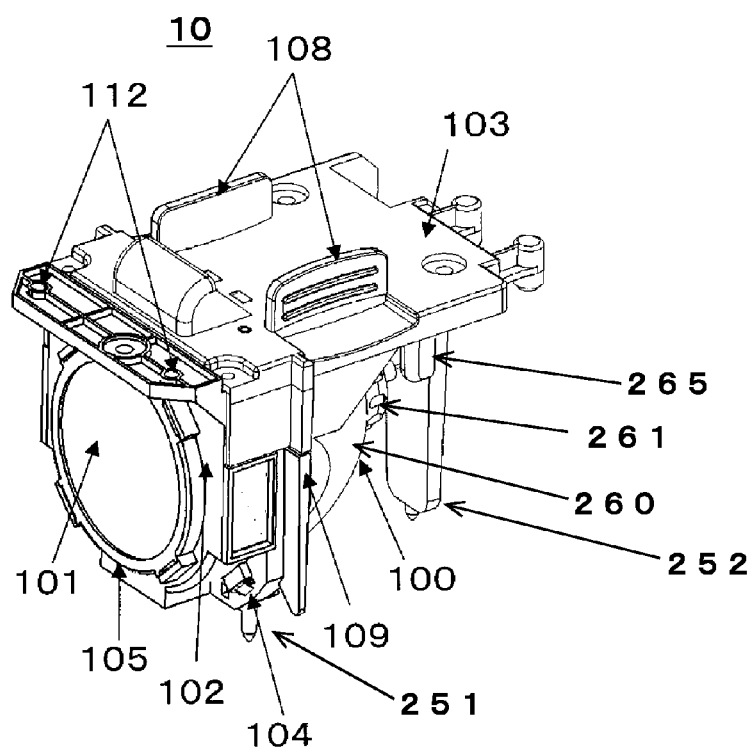
FIG. 2 is a schematic structural diagram of a lamp unit according to a first embodiment which is one aspect of the present invention.
Figure 2:
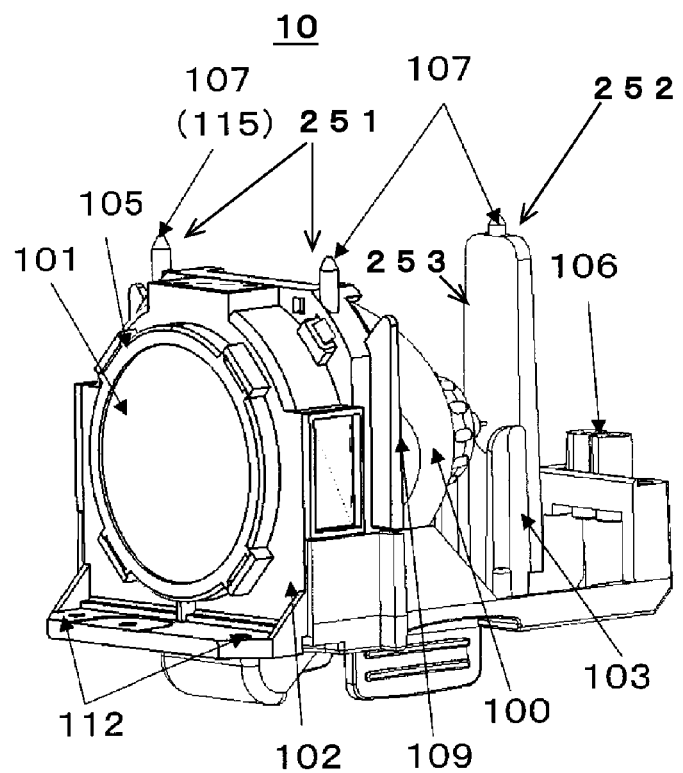
Figure 3:
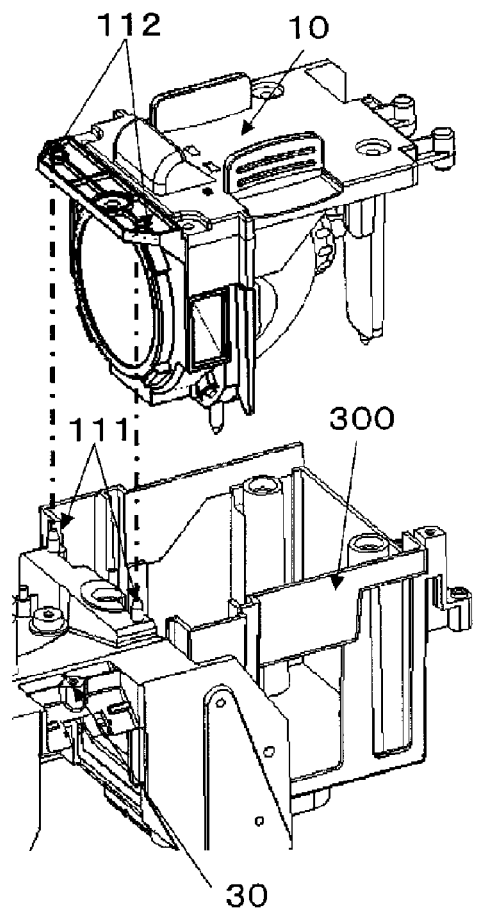
FIG. 3 is a schematic structural diagram regarding installation of the lamp unit according to the first embodiment which is one aspect of the present invention.
Figure 3:
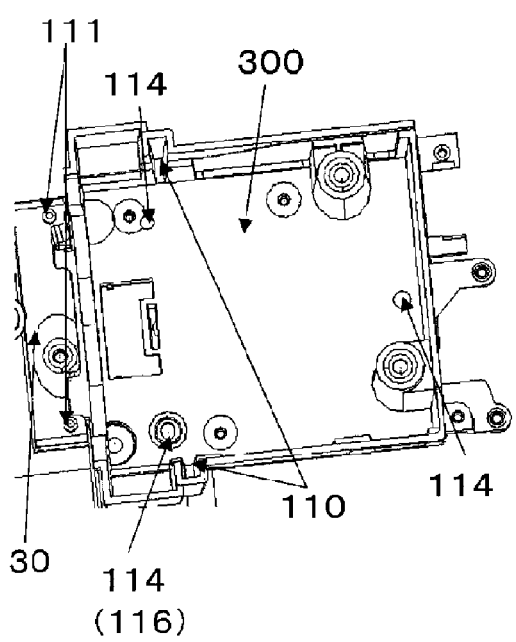

FIG. 2 is a schematic structural diagram of the lamp unit 10 according to the first embodiment. (a) of the same figure is a perspective diagram viewing the lamp unit 10 from a side of a handle section 108, and (b) of the same figure is an upside down perspective diagram of that of (a) of the same figure. FIG. 3 is a schematic structural diagram regarding installation of the lamp unit 10 according to the first embodiment. (a) of the same figure is a perspective diagram viewing a lamp housing 300 from above, and (b) of the same figure is an inner perspective diagram of the lamp housing 300 when the lamp unit 10 is taken out. The projector is structured so that the lamp unit 10 and the illumination optical system 30 can be separated. The illumination optical system 30 is integrally formed on the lamp housing 300. The lamp housing 300 is a box whose one end is open, and the lamp unit 10 can be moved in and out through that one end side (upper side in FIG. 3(a)). After the lamp unit 10 is housed in the lamp housing 300, a lamp lid (diagrammatic representation omitted) is closed. With the projector, when the lifespan of the lamp 100 elapses, a worker can open the lamp lid forming one portion of an exterior surface of the projector, and take out the lamp unit 10 to replace the lamp unit 10. In a state where the lamp unit 10 is housed inside the lamp housing 300, the lamp housing 300 blocks light from the lamp 100 and blocks heat generated by the lamp 100. Furthermore, in this state, light emitted from the lamp unit 10 enters the illumination optical system 30.

The lamp unit 10 includes: the lamp 100 configured to function as the light source of the projector; a light condensing lens 101 configured to condense light emitted from the lamp 100; a lamp holder 102/103 configured to hold the lamp 100 and the light condensing lens 101; the handle section 108 for installing/removing the lamp unit 10 to/from the projector; and a support section 251/252 used for placing down the lamp unit 10 removed from the projector on a surface and configured to support the lamp unit 10 from below. The lamp holder 102/103 includes a holder body 102 configured to hold the lamp 100 and the light condensing lens 101, and an opposing section 103 that extends backward from the holder body 102 and opposes an outer circumferential surface of the lamp 100. Since the holder body 102 is subjected to the heat from the lamp 100, the holder body 102 is formed from highly heat resistive resins such as polyphenylene sulfide resin (PPS) and liquid crystal polymer (LCP), and metallic materials such as aluminum die-casts having fine thermal conductivity. In order to hold the lamp 100, the holder body 102 is pressed against the lamp 100 at four corners by lamp springs 104 which are metallic components such as spring materials, so as to have the lamp 100 installed. Furthermore, the light condensing lens 101 is installed on the holder body 102 from an opposite side of the lamp 100. The light condensing lens 101 is pressed against the holder body 102 by a lens spring 105 which is a metallic component such as a spring material similar to the lamp springs 104, so as to be installed on the holder body 102. The opposing section 103 blocks heat from the lamp 100, and holds a socket 106 that supplies power to the lamp 100. The socket 106 is provided on the back of the opposing section 103. The opposing section 103 is installed on the holder body 102 using screws or the like. Thus, the opposing section 103 is integrally formed on the holder body 102. The handle section 108 that can be held by a worker's hand for replacing the lamp unit 10 is provided on a surface (upper surface in FIG. 2(a)) opposite to the lamp 100 on the opposing section 103. The handle section 108 is integrally formed on the opposing section 103. The opposing section 103 is formed from resins having high heat resistivity and low thermal conductivity such as PPS and LCP, such that the worker can hold the handle section 108 with his/her hand.

As shown in FIG. 3(a), two datum pins 111 are disposed on the illumination optical system 30 for restricting positions of the illumination optical system 30 and the lamp unit 10. By fitting the two datum pins 111 in two datum holes 112 on the lamp unit 10 side, the position of the lamp unit 10 with respect to the illumination optical system 30 is determined. The two datum holes 112 are formed on an upper surface of a front wall of the lamp housing 300. The illumination optical system 30 and the lamp unit 10 are fixed with respect to each other using screws.

When inserting the lamp unit 10, in order to smoothly fit the two datum pins 111 of the illumination optical system 30 in the two datum holes 112 of the lamp unit 10, two guide grooves 110 are provided on the illumination optical system 30 to assist insertion of the lamp unit 10. Each of the guide grooves 110 is disposed on an inner lateral wall of the lamp housing 300. On the holder body 102 of the lamp unit 10, two guide ribs 109 are disposed at positions corresponding to the guide grooves 110. As a result of the guide ribs 109 fitting in the respective guide grooves 110, the lamp unit 10 can be smoothly installed or removed.

The support section 251/252 includes a front side support section 251 for supporting the lamp unit 10 at a front side of the lamp unit 10, and a back side support section 252 for supporting the lamp unit 10 at a back side of the lamp unit 10. The front side support section 251 includes two protruding sections 107 protruding from an outer surface of the holder body 102. When the lamp unit 10 is viewed from the front (i.e., when the lamp unit 10 is viewed from a light emission side of the lamp unit 10 along a light axis of the lamp 100), the front side support section 251 supports the lamp unit 10 at tips of the protruding sections 107 located outside an outer circumference of the lamp 100 and an outer circumference of the holder body 102. On the other hand, the back side support section 252 is disposed on the back of the lamp 100. The back side support section 252 includes a plate section 253 standing on a surface on the lamp 100 side of the opposing section 103 on the holder side, and a protruding section 107 protruding from a tip surface of the plate section 253. When the lamp unit 10 is viewed from the front, the back side support section 252 supports the lamp unit 10 at tips of the protruding sections 107 located outside an outer circumference of the lamp 100 and an outer circumference of the holder body 102. Furthermore, the plate section 253 is disposed so as to shield a site having an installation hole for a bulb of the lamp 100 described later.

Specifically, the lamp 100 includes a bulb (diagrammatic representation omitted), a reflector 260, and an emitted light transmission section (diagrammatic representation omitted). The emitted light transmission section forms a front surface of the lamp 100, and is formed from, for example, glass. The emitted light transmission section allows light emitted from the bulb to pass through. The reflector 260 is connected to an outer circumference of the emitted light transmission section, and has a shape that becomes narrower as the distance from the emitted light transmission section becomes larger. The reflector 260 is formed from, for example, a glass treated with a process for preventing ultraviolet rays to pass through, and reflects light emitted from the bulb toward a side of the emitted light transmission section. In the lamp 100, a bulb installation part 261 having formed thereon an installation hole for the bulb is disposed at a back end of the reflector 260. The bulb is installed inside the lamp 100 through this installation hole. After the bulb is installed, the installation hole is blocked, for example, by covering it with a lid member or filling inside of it with cement etc.

Here, ultraviolet rays emitted by the bulb pass through a blocking member such as the lid member or the cement. Therefore, in the first embodiment, ultraviolet rays are blocked by the plate section 253 of the back side support section 252 shielding the site of the installation hole for the bulb of the lamp 100. A width of the plate section 253 is larger than the diameter of the installation hole for the bulb, and the plate section 253 extends in the width direction of the opposing section 103. The plate section 253 is slightly separated from the installation hole for the bulb for suppressing transfer of heat from the lamp 100. Therefore, the plate section 253 is adjacent to the installation hole for the bulb. The plate section 253 not only blocks ultraviolet rays but also prevents the worker from touching the back end of the lamp 100 whose temperature may be high. In the first embodiment, lateral side shielding walls 265 each extending from both ends in the width direction of the plate section 253 toward the front are also provided.

The support section 251/252 include, on the opposite side of the handle section 108 of the lamp opposing section 103, three or more of the protruding sections 107 on the holder body 102 or the opposing section 103. These protruding sections 107 are each inserted in the protruding-section recesses 114 which are formed on the lamp housing 300 by the same number of the protruding sections 107. Thus, when the lamp 100 is turned on, since the protruding sections 107 are each unlikely to be directly subjected to heat from the lamp 100, increases in their temperature are suppressed. Tips of each of the protruding sections 107 are tapered so as to be thin, and areas of the tip surfaces are small. In addition, the tips of these protruding sections 107 are on the same plane. This plane is, for example, approximately parallel to the light axis of the lamp 100. Therefore, the protruding sections 107, when they are pointed downward, can support the lamp unit 10 in a well-balanced manner. It should be noted that the number of the protruding sections 107 is not limited to three, and the number may be four or larger. When the number of the protruding sections 107 is four, for example, the front side support section 251 may have two of the protruding sections 107, and the back side support section 252 may have two of the protruding sections 107.

Furthermore, when the lamp unit 10 is large and there is a concern that the lamp unit 10 screwed on the illumination optical system 30 may topple, it is also possible to use one of the protruding sections 107 on the holder body 102 as a toppling prevention datum pin 115, and use one of the protruding-section recesses 114 on the illumination optical system 30 side as a toppling prevention datum hole 116. With this, toppling of the lamp unit 10 is suppressed.

With the above described configuration, when replacing the lamp unit 10, it is possible to open the lamp lid, hold the handle section 108 of the lamp unit 10, take out the lamp unit 10, and, while holding the handle section 108, place the lamp unit 10 on a desk or the like such that the opposite side of the handle section 108 faces downward. In other words, the support section 251/252 supports the lamp unit 10 from the opposite side of the handle section 108 with respect to the lamp 100. Therefore, the worker can place the removed lamp unit 10 on a desk or the like without shifting his/her hand from the handle section 108 to a part other than the handle section 108. It should be noted that, instead of the support section 251/252 supporting the lamp unit 10 from the opposite side of the handle section 108 with respect to the lamp 100, the support section 251/252 may support the lamp unit 10 from a direction rotated by a certain angle of not less than 90 degrees but less than 180 degrees from a direction in which the handle section 108 is disposed with reference to the light axis of the lamp 100. For example, when the support section 251/252 supports the lamp unit 10 from a 90 degree-rotated direction, the support section 251/252 is laterally disposed on the lamp 100 in FIG. 2(a). Furthermore, since only the tips of the protruding sections 107 of the lamp unit 10 make contact with a placement surface where the worker places the lamp unit 10, transfer of heat from the lamp unit 10 to the placement surface is suppressed.

Second Embodiment

Since components included in a projector in a second embodiment are same as the components in the first embodiment, detailed descriptions thereof are omitted.

Figure 4:
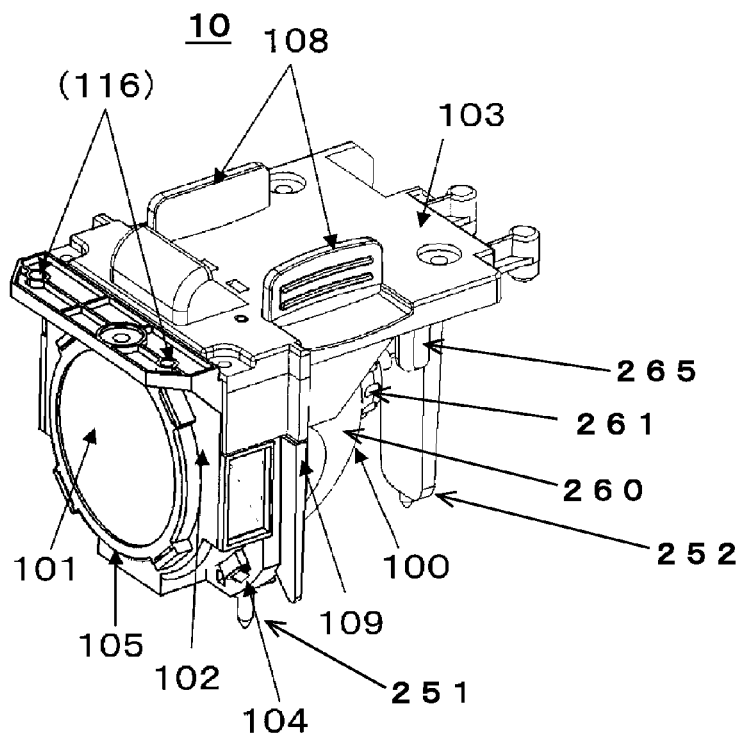
FIG. 4 is a schematic structural diagram of a lamp unit according to a second embodiment which is one aspect of the present invention.
Figure 4:
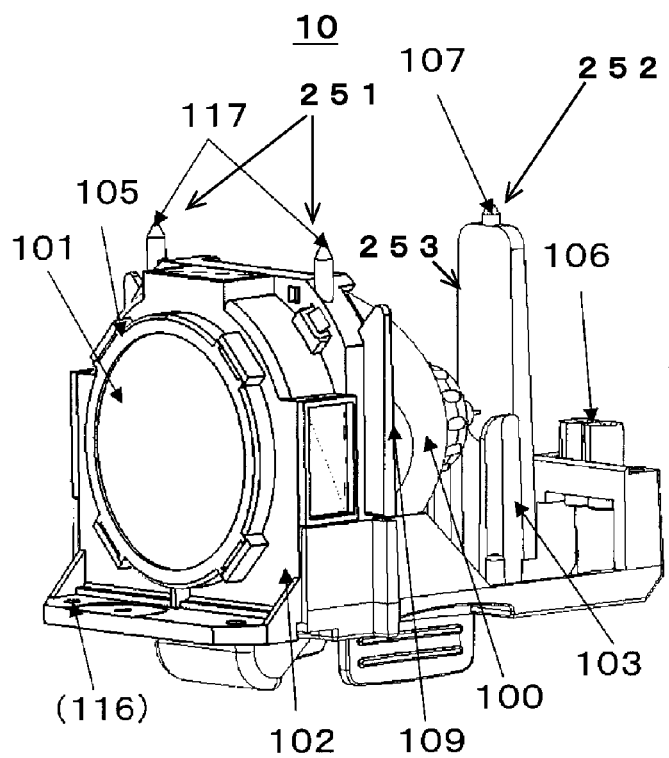
Figure 5:
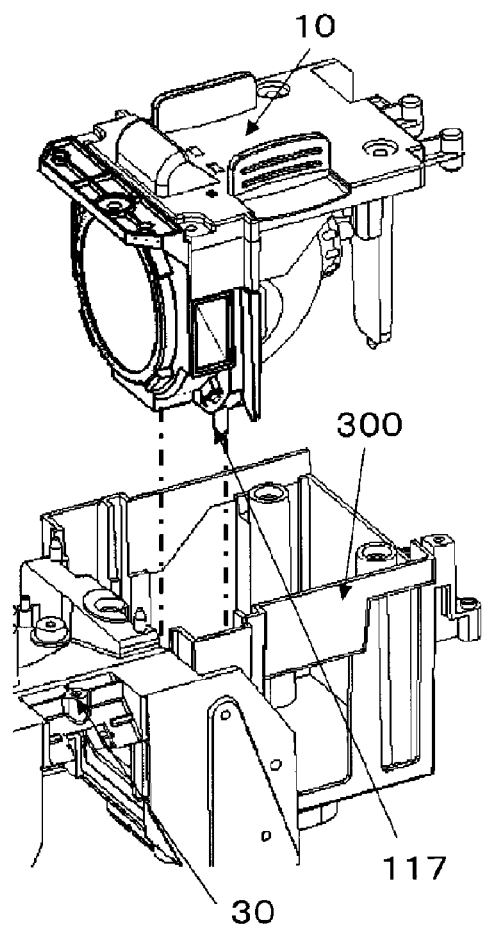
FIG. 5 is a schematic structural diagram regarding installation of the lamp unit according to the second embodiment which is one aspect of the present invention.
Figure 5:
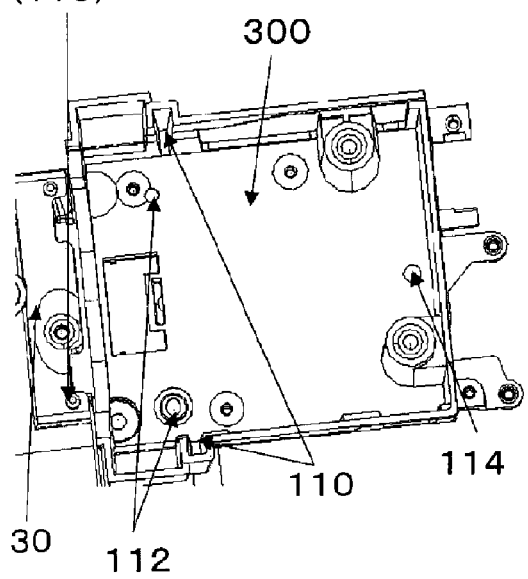

FIG. 4 is a schematic structural diagram of the lamp unit 10 according to the second embodiment. (a) of the same figure is a perspective diagram viewing the lamp unit 10 from the handle section 108 side, and (b) of the same figure is an upside down perspective diagram of that of (a) of the same figure. FIG. 5 is a schematic structural diagram regarding installation of the lamp unit 10 according to the second embodiment. (a) of the same figure is a perspective diagram viewing the lamp housing 300 from above, and (b) of the same figure is an inner perspective diagram of the lamp housing 300 when the lamp unit 10 is taken out. The projector is structured so that the lamp unit 10 and the illumination optical system 30 can be separated. When the lifespan of the lamp 100 elapses, the worker can open the lamp lid (diagrammatic representation omitted) forming one portion of the exterior surface of the projector, and take out the lamp unit 10 to replace the lamp unit 10. The lamp unit 10 is housed inside the lamp housing 300. The lamp housing 300 blocks light from the lamp 100 and blocks heat generated by the lamp 100.

The lamp unit 10 includes the lamp 100, the light condensing lens 101, the lamp holder 102/103, the handle section 108, and the support section 251/252. The lamp 100 and the light condensing lens 101 are held by the holder body 102 of the lamp holder 102/103. Since the holder body 102 is subjected to heat from the lamp 100, the holder body 102 is formed using highly heat resistive resins such as PPS and LCP, and metallic materials such as aluminum die-casts having fine thermal conductivity. In order to hold the lamp 100, the holder body 102 is pressed against the lamp 100 at four corners by the lamp springs 104 which are metallic components such as spring materials, so as to have the lamp 100 installed. Furthermore, the light condensing lens 101 is installed on the holder body 102 from an opposite side of the lamp 100. The light condensing lens 101 is pressed against the holder body 102 by the lens spring 105 which is a metallic component such as a spring material similar to the lamp springs 104, so as to be installed on the holder body 102. The opposing section 103 of the lamp holder 102/103 blocks heat from the lamp 100. In addition, the opposing section 103 holds the socket 106 that supplies power to the lamp 100. The opposing section 103 is installed on the holder body 102 using screws or the like. The handle section 108 that can be held by a worker's hand when replacing the lamp unit 10 is provided on a surface (upper surface in FIG. 4(a)) opposite to the lamp 100 on the opposing section 103. The opposing section 103 is formed from resins having high heat resistivity and low thermal conductivity such as PPS and LCP, such that the worker can hold the handle section 108 with his/her hand.

On the opposite side of the handle section 108 of the opposing section 103, two protruding section-and-datum pins 117 are disposed on the holder body 102, and one protruding section 107 is disposed on the opposing section 103. The two protruding section-and-datum pins 117 form the front side support section 251. The one protruding section 107 forms the back side support section 252 together with the plate section 253. When the lamp unit 10 is viewed from the front, both the front side support section 251 and the back side support section 252 support the lamp unit 10 at the tips of the protruding sections 117 and 107 located outside the outer circumference of the lamp 100 and the outer circumference of the holder body 102. Unlike in the first embodiment, in the second embodiment, as shown in FIG. 5(a), the two protruding section-and-datum pins 117 of the holder body 102 are used to restrict the positions of the illumination optical system 30 and the lamp unit 10. By providing, on the illumination optical system 30 side, the two datum holes 112 in which the two protruding section-and-datum pins 117 are to be inserted, the position of the lamp unit 10 with respect to the illumination optical system 30 can be determined. The one protruding section 107 on the opposing section 103 side is inserted in the protruding-section recess 114 formed on the bottom surface of the lamp housing 300. The two protruding section-and-datum pins 117 and the one protruding section 107 are unlikely to be directly subjected to heat from the lamp 100. Furthermore, tips of the protruding section-and-datum pins 117 and the protruding section 107 are tapered so as to be thin, and areas of the tip surfaces are small. In addition, the tips of protruding section-and-datum pins 117 and the tip of the protruding section 107 are on the same plane. Therefore, the tips of the protruding section-and-datum pins 117 and the protruding section 107, when they are pointed downward, can support the lamp unit 10 in a well-balanced manner.

Furthermore, when the lamp unit 10 is large and there is a concern that the lamp unit 10 screwed on the illumination optical system 30 may topple, it is also possible to provide the toppling prevention datum hole 116 on the handle section 108 side of the holder body 102, and fit the toppling prevention datum pin 115 on the illumination optical system 30 side in the toppling prevention datum hole 116. With this, toppling of the lamp unit 10 is suppressed.

When inserting the lamp unit 10, in order to smoothly fit the two protruding section-and-datum pins 117 in the two datum holes 112, the two guide grooves 110 are provided on the illumination optical system 30 to assist insertion of the lamp unit 10. As a result of the two guide ribs 109 disposed on the holder body 102 side of the lamp unit 10 fitting in the two guide grooves 110, the lamp unit 10 can be smoothly installed or removed.

With the above described configuration, when replacing the lamp unit 10, it is possible to open the lamp lid, hold the handle section 108 of the lamp unit 10, take out the lamp unit 10, and, while holding the handle section 108, place the lamp unit 10 on a desk or the like such that the opposite surface side of the handle section 108 faces downward.

Third Embodiment

Since components included in a projector in a third embodiment are same as the components in the first embodiment, detailed descriptions thereof are omitted.

Figure 6:
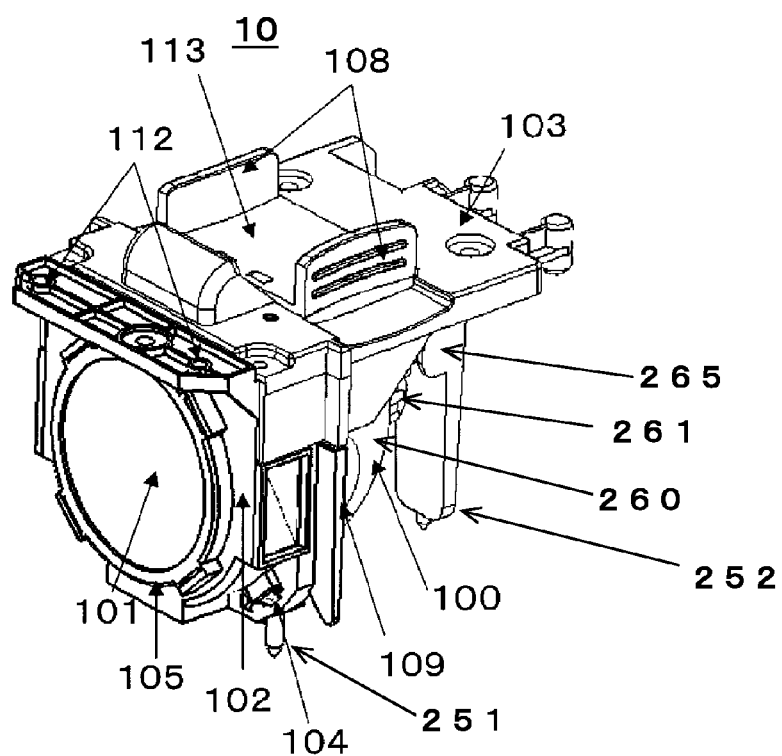
FIG. 6 is a schematic structural diagram of a lamp unit according to a third embodiment which is one aspect of the present invention.
Figure 6:
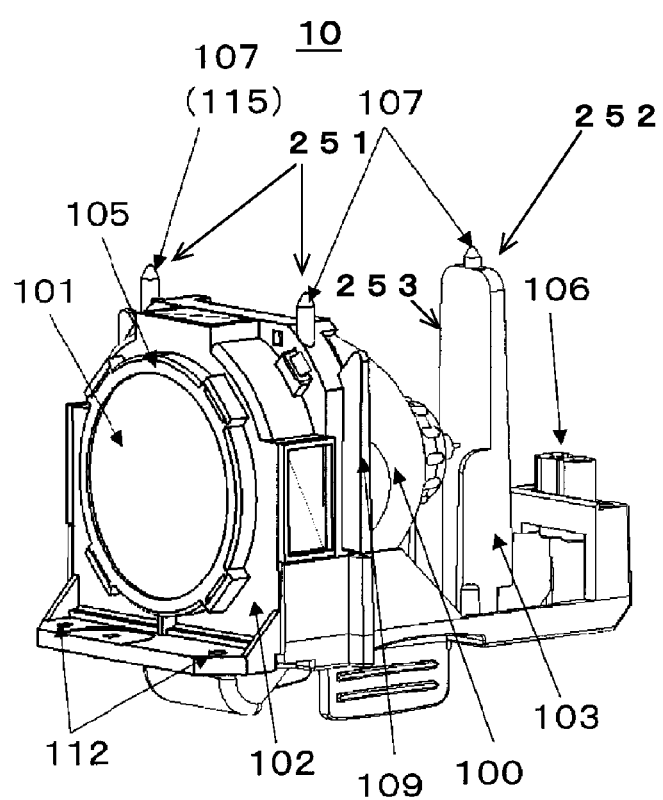
Figure 7:
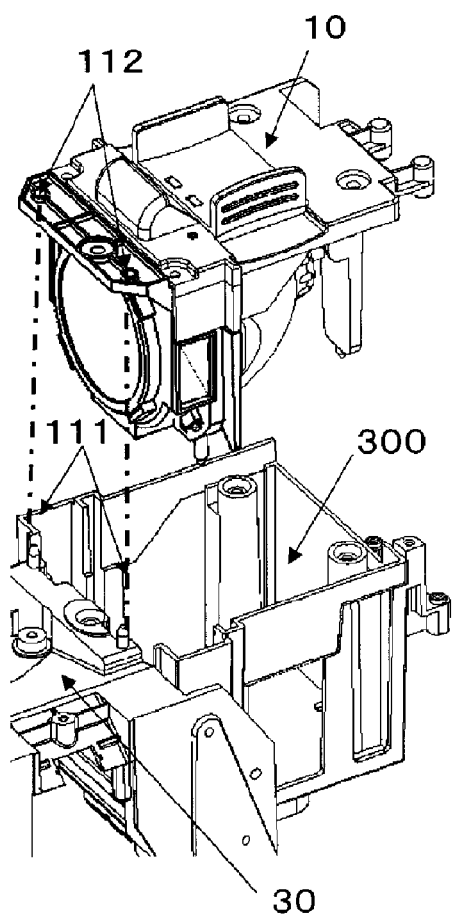
FIG. 7 is a schematic structural diagram regarding installation of the lamp unit according to the third embodiment which is one aspect of the present invention.
Figure 7:
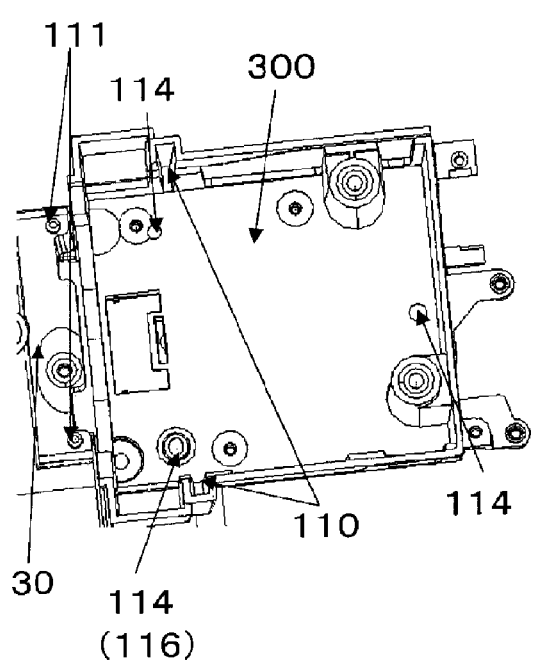

FIG. 6 is a schematic structural diagram of the lamp unit 10 according to the third embodiment. (a) of the same figure is a perspective diagram viewing the lamp unit 10 from the handle section 108 side, and (b) of the same figure is an upside down perspective diagram of that of (a) of the same figure. FIG. 7 is a schematic structural diagram regarding installation of the lamp unit 10 according to the third embodiment. (a) of the same figure is a perspective diagram viewing the lamp housing 300 from above, and (b) of the same figure is an inner perspective diagram of the lamp housing 300 when the lamp unit is taken out. The projector is structured so that the lamp unit 10 and the illumination optical system 30 can be separated. When the lifespan of the lamp 100 elapses, the worker can open the lamp lid (diagrammatic representation omitted) forming one portion of the exterior surface of the projector, and take out the lamp unit 10 to replace the lamp unit 10. The lamp unit 10 is housed inside the lamp housing 300. The lamp housing 300 blocks light from the lamp 100 and blocks heat generated by the lamp 100.

The lamp unit 10 includes the lamp 100, the light condensing lens 101, the lamp holder 102/103, the handle section 108, and the support section 251/252. The lamp 100 and the light condensing lens 101 are held by the holder body 102 of the lamp holder 102/103. Since the holder body 102 is subjected to heat from the lamp 100, the holder body 102 is formed using highly heat resistive resins such as PPS and LCP, and metallic materials such as aluminum die-casts having fine thermal conduction. In order to hold the lamp 100, the holder body 102 is pressed against the lamp 100 at four corners by the lamp springs 104 which are metallic components such as spring materials, so as to have the lamp 100 installed. Furthermore, the light condensing lens 101 is installed on the holder body 102 from an opposite side of the lamp 100. The light condensing lens 101 is pressed against the holder body 102 by the lens spring 105 which is a metallic component such as a spring material similar to the lamp springs 104, so as to be installed on the holder body 102. The opposing section 103 of the lamp holder 102/103 blocks heat from the lamp 100. The opposing section 103 holds the socket 106 that supplies power to the lamp 100. The opposing section 103 is installed on the holder body 102 using screws or the like. Since the opposing section 103 is directly subjected to heat from the lamp 100, the opposing section 103 is formed from highly heat resistive resins such as PPS and LCP. In addition, on an opposite surface (upper surface in FIG. 6(a)) of the opposing section 103 with respect to the lamp 100, a lamp handle 113 that can be held by the worker with his/her hand when replacing the lamp unit 10 is provided as a separate component. The lamp handle 113 includes the handle section 108. The lamp handle 113 is, for example, removed when the lamp unit 10 is being used, and installed on the opposing section 103 when replacing the lamp unit 10. The lamp handle 113 is formed from resins having low thermal conductivity such as PC+ABS, so as to allow the worker to hold the lamp handle 113 directly with his/her hand even immediately after the set (lamp turned on) has been used.

As shown in FIG. 7(a), the two datum pins 111 are disposed on the illumination optical system 30 for restricting positions of the illumination optical system 30 and the lamp unit 10. By fitting the two datum pins 111 in the two datum holes 112 on the lamp unit 10 side, the position of the lamp unit 10 with respect to the illumination optical system 30 is determined. The illumination optical system 30 and the lamp unit 10 are fixed with respect to each other using screws.

In order to smoothly fit the two datum pins 111 of the illumination optical system 30 in the two datum holes 112 of the lamp unit 10 when inserting the lamp unit 10, the two guide grooves 110 are provided on the illumination optical system 30 to assist insertion of the lamp unit 10. As a result of the two guide ribs 109 disposed on the holder body 102 side of the lamp unit 10 fitting in the two guide grooves 110, the lamp unit 10 can be smoothly installed or removed.

On the opposite surface side of the lamp handle 113, three or more protruding sections 107 are disposed on the holder body 102 or the lamp opposing section 103. Two of the protruding sections 107 on the holder body 102 form the front side support section 251. One of the protruding sections 107 on a tip surface of the plate section 253 forms the back side support section 252 together with the plate section 253. These protruding sections 107 are each inserted in the protruding-section recesses 114 of the lamp housing 300. Thus, when the lamp 100 is turned on, since the protruding sections 107 are each unlikely to be directly subjected to heat from the lamp 100, increases in their temperature are suppressed. The tips of each of the protruding sections 107 are tapered so as to be thin, and areas of the tip surfaces are small. In addition, the tips of these protruding sections 107 are on the same plane. Therefore, the protruding sections 107, when they are pointed downward, can support the lamp unit 10 in a well-balanced manner.

Furthermore, when the lamp unit 10 is large and there is a concern that the lamp unit 10 screwed on the illumination optical system 30 may topple, it is also possible to use one of the protruding sections 107 on the holder body 102 as the toppling prevention datum pin 115, and use one of the protruding-section recesses 114 on the illumination optical system 30 side as the toppling prevention datum hole 116. With this, toppling of the lamp unit 10 is suppressed.

With the above described configuration, when replacing the lamp unit 10, it is possible to open the lamp lid, hold the handle section 108 of the lamp handle 113 of the lamp unit 10, take out the lamp unit 10, and, while holding the handle section 108, place the lamp unit 10 on a desk or the like such that the opposite surface side of the handle section 108 faces downward.

Fourth Embodiment

Since components included in a projector in a fourth embodiment are same as the components in the first embodiment, detailed descriptions thereof are omitted.

Figure 8:
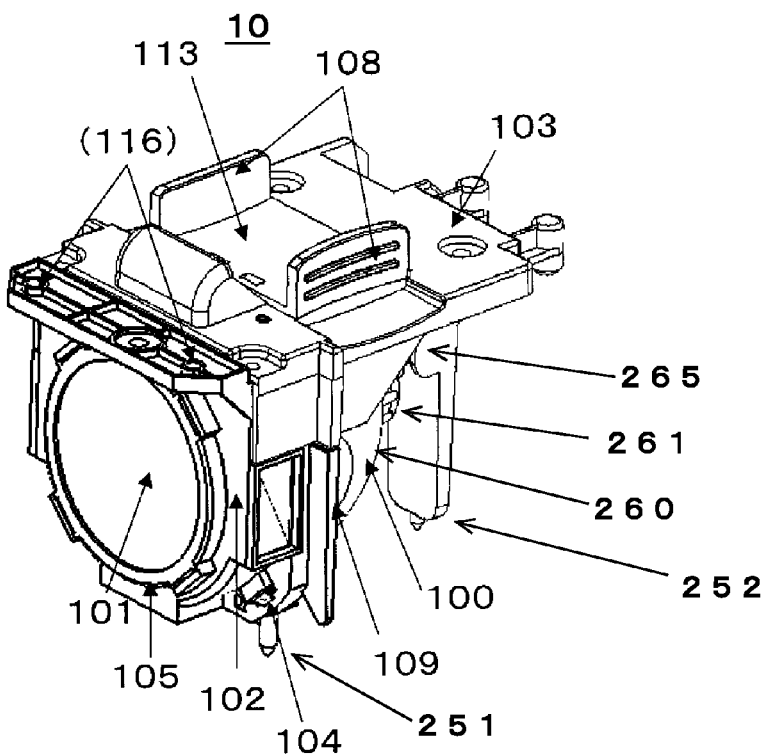
FIG. 8 is a schematic structural diagram of a lamp unit according to a fourth embodiment which is one aspect of the present invention.
Figure 8:
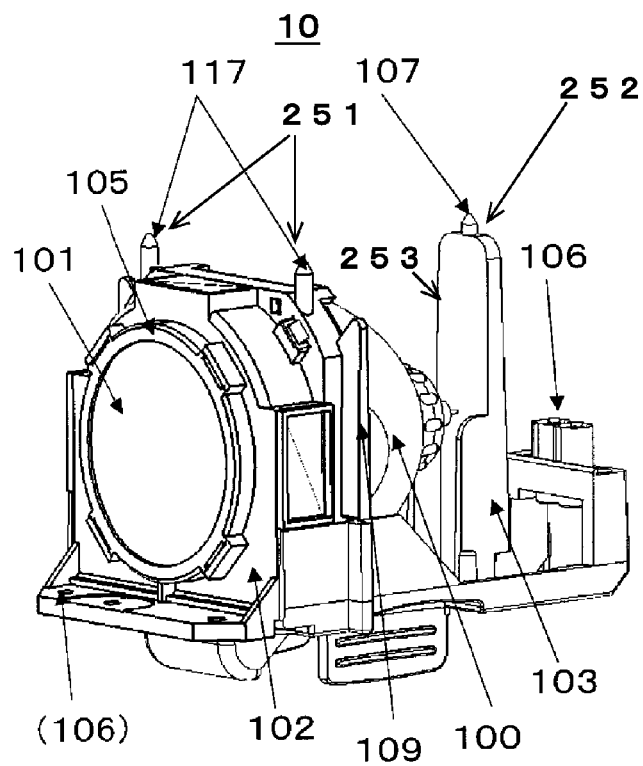
Figure 9:
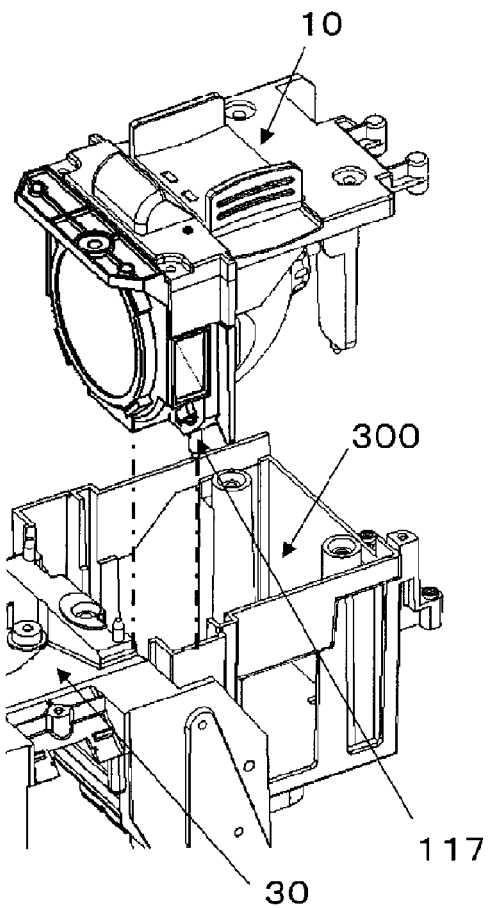
FIG. 9 is a schematic structural diagram regarding installation of the lamp unit according to the fourth embodiment which is one aspect of the present invention.
Figure 9:
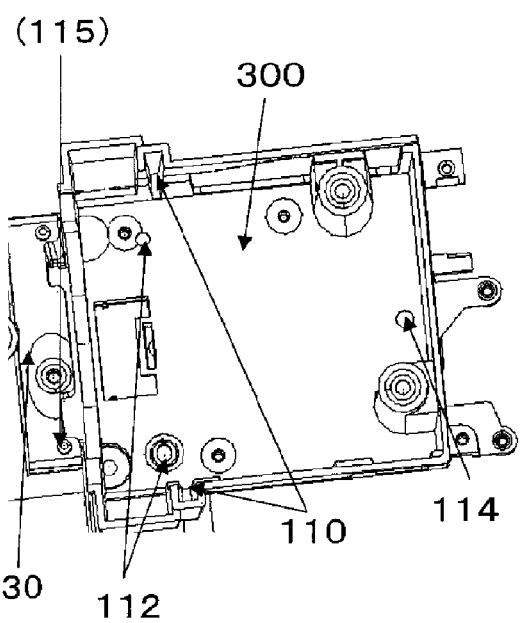

FIG. 8 is a schematic structural diagram of the lamp unit 10 according to the fourth embodiment. (a) of the same figure is a perspective diagram viewing the lamp unit 10 from the handle section 108 side, and (b) of the same figure is an upside down perspective diagram of that of (a) of the same figure. FIG. 9 is a schematic structural diagram regarding installation of the lamp unit 10 according to the fourth embodiment. (a) of the same figure is a perspective diagram viewing the lamp housing 300 from above, and (b) of the same figure is an inner perspective diagram of the lamp housing 300 when the lamp unit is taken out.

The lamp unit 10 and the illumination optical system 30 are structured so as to be separable from each other. When the lifespan of the lamp 100 elapses, the worker can open the lamp lid (diagrammatic representation omitted) forming one portion of the exterior surface of the projector, and take out the lamp unit 10 to replace the lamp unit 10. The lamp unit 10 is housed inside the lamp housing 300. The lamp housing 300 blocks light from the lamp 100 and blocks heat generated by the lamp 100.

The lamp unit 10 includes the lamp 100, the light condensing lens 101, the lamp holder 102/103, the handle section 108, and the support section 251/252. The lamp 100 and the light condensing lens 101 are held by the holder body 102 of the lamp holder 102/103. Since the holder body 102 is subjected to heat from the lamp 100, the holder body 102 is formed using highly heat resistive resins such as PPS and LCP, and metallic materials such as aluminum die-casts having fine thermal conduction. In order to hold the lamp 100, the holder body 102 is pressed against the lamp 100 at four corners by the lamp springs 104 which are metallic components such as spring materials, so as to have the lamp 100 installed. Furthermore, the light condensing lens 101 is installed on the holder body 102 from an opposite side of the lamp 100. The light condensing lens 101 is pressed against the holder body 102 by the lens spring 105 which is a metallic component such as a spring material similar to the lamp springs 104, so as to be installed on the holder body 102. The opposing section 103 of the lamp holder 102/103 blocks heat from the lamp 100. In addition, the opposing section 103 holds the socket 106 that supplies power to the lamp 100. The opposing section 103 is installed on the holder body 102 using screws or the like. Since the opposing section 103 is directly subjected to heat from the lamp 100, the opposing section 103 is formed from highly heat resistive resins such as PPS and LCP. In addition, on the opposite surface (upper surface in FIG. 8(a))

of the opposing section 103 with respect to the lamp 100, the lamp handle 113 that can be held by the worker with his/her hand when replacing the lamp unit 10 is provided as a separate component. Similarly to the third embodiment, the lamp handle 113 is detachable and reattachable with respect to the opposing section 103. The handle section 108 of the lamp handle 113 is formed from resins having low thermal conductivity such as PC+ABS, so as to allow the worker to hold the handle section 108 directly with his/her hand even immediately after the set (lamp turned on) has been used.

On the opposite surface side of the lamp handle 113, two protruding section-and-datum pins 117 are disposed on the holder body 102 and one protruding section 107 is disposed on the tip of the plate section 253 standing on the opposing section 103. The two protruding section-and-datum pins 117 and the one protruding section 107 form the support section 251/252 similarly to the second embodiment. Unlike in the third embodiment, in the fourth embodiment, as shown in FIG. 9(a), the two protruding section-and-datum pins 117 of the holder body 102 are used to restrict the positions of the illumination optical system 30 and the lamp unit 10. By providing, on the illumination optical system 30 side, the two datum holes 112 in which the two protruding section-and-datum pins 117 are to be inserted, the position of the lamp unit 10 with respect to the illumination optical system 30 can be determined. The one protruding section 107 on the opposing section 103 side is inserted in the protruding-section recess 114 formed on the bottom surface of the lamp housing 300. The two protruding section-and-datum pins 117 and the one protruding section 107 are unlikely to be directly subjected to heat from the lamp 100. Furthermore, tips of the protruding section-and-datum pins 117 and a tip of the protruding section 107 are tapered so as to be thin, and areas of the tip surfaces are small. In addition, the tips of the protruding section-and-datum pins 117 and the tip of the protruding section 107 are on the same plane. Therefore, the tips of the protruding section-and-datum pins 117 and the protruding section 107, when they are pointed downward, can support the lamp unit 10 in a well-balanced manner.

Furthermore, when the lamp unit 10 is large and there is a concern that the lamp unit 10 screwed on the illumination optical system 30 may topple, it is also possible to provide the toppling prevention datum hole 116 on the handle section 108 side of the holder body 102, and fit the toppling prevention datum pin 115 on the illumination optical system 30 side in the toppling prevention datum hole 116. With this, toppling of the lamp unit 10 is suppressed.

When inserting the lamp unit 10, in order to smoothly fit the two protruding section-and-datum pins 117 in the two datum holes 112, the two guide grooves 110 are provided on the illumination optical system 30 to assist insertion of the lamp unit 10. As a result of the two guide ribs 109 disposed on the holder body 102 side of the lamp unit 10 fitting in the two guide grooves 110, the lamp unit 10 can be smoothly installed or removed.

With the above described configuration, when replacing the lamp unit 10, it is possible to open the lamp lid, hold the handle section 108 of the lamp handle 113 of the lamp unit 10, take out the lamp unit 10, and, while holding the handle section 108, place the lamp unit 10 on a desk or the like such that the opposite surface side of the handle section 108 faces downward.

Fifth Embodiment

Since components included in a projector in a fifth embodiment are same as the components in the first embodiment, detailed descriptions thereof are omitted.

Figure 10:
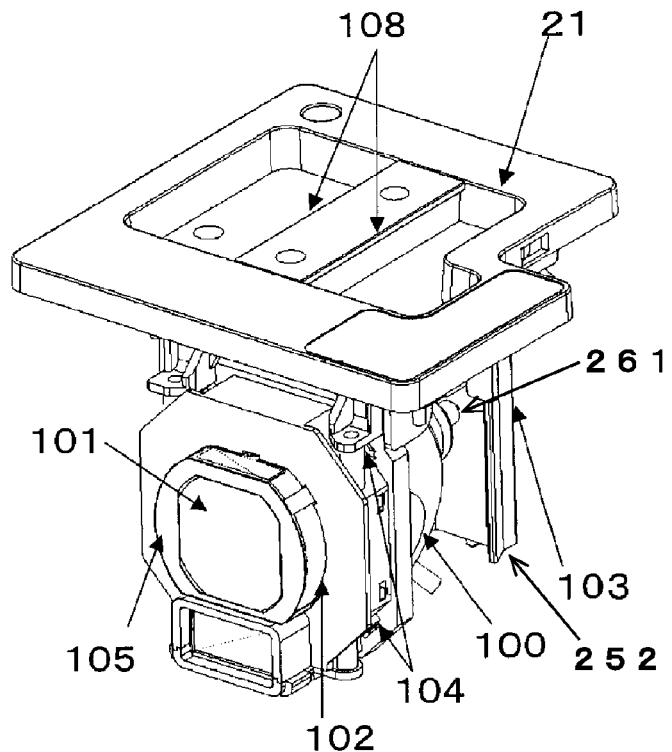
FIG. 10 is a schematic structural diagram of a lamp unit integrally formed with a lamp lid according to a fifth embodiment which is one aspect of the present invention.
Figure 10:
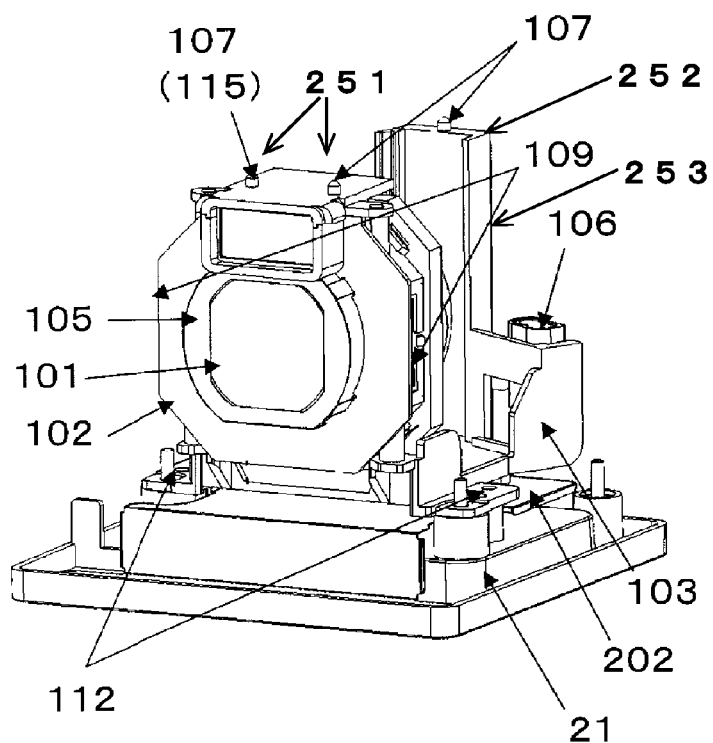
Figure 11:
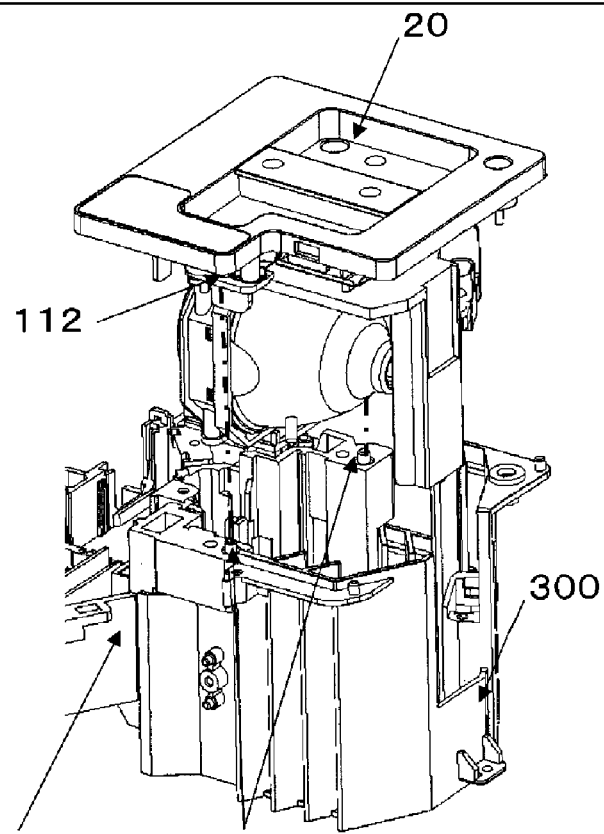
FIG. 11 is a schematic structural diagram regarding installation of the lamp unit integrally formed with the lamp lid according to the fifth embodiment which is one aspect of the present invention.
Figure 11:
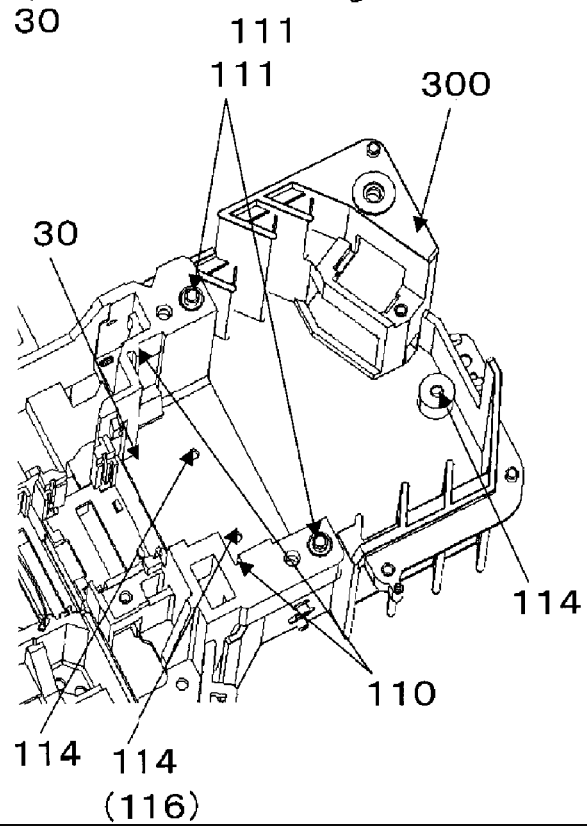

FIG. 10 is a schematic structural diagram of a lamp-lid integrally-formed lamp unit 20 (hereinafter, the lamp unit 20) of the fifth embodiment. (a) of the same figure is a perspective diagram viewing the lamp unit 20 from the handle section 108 side, and (b) of the same figure is an upside down perspective diagram of that of (a) of the same figure. FIG. 11 is a schematic structural diagram regarding installation of the lamp unit 20 according to the fifth embodiment. (a) of the same figure is a perspective diagram viewing the lamp housing 300 from above, and (b) of the same figure is an inner perspective diagram of the lamp housing 300 when the lamp unit is taken out.

The lamp unit 20 and the illumination optical system 30 are structured so as to be separable from each other. When the lifespan of the lamp 100 elapses, the worker can take out the lamp unit 20 to replace the lamp unit 20. A main body side of the lamp unit 20 is housed inside the lamp housing 300. The lamp housing 300 blocks light from the lamp 100 and blocks heat generated by the lamp 100.

The lamp unit 20 includes the lamp 100, the light condensing lens 101, the lamp holder 102/103, the handle section 108, and the support section 251/252. The lamp 100 and the light condensing lens 101 are held by the holder body 102 of the lamp holder 102/103. Since the holder body 102 is subjected to heat from the lamp, the holder body 102 is formed from highly heat resistive resins such as PPS and LCP, and metallic materials having fine thermal conductivity such as aluminum die-casts. In order to hold the lamp 100, the holder body 102 is pressed against the lamp 100 at four corners by the lamp springs 104 which are metallic components such as spring materials, so as to have the lamp 100 installed.

Furthermore, the light condensing lens 101 is installed on the holder body 102 from an opposite side of the lamp 100. The light condensing lens 101 is pressed against the holder body 102 by the lens spring 105 which is a metallic component such as a spring material similar to the lamp springs 104, so as to be installed on the holder body 102. The opposing section 103 of the lamp holder 102/103 blocks heat from the lamp 100. In addition, the opposing section 103 holds the socket 106 that supplies power to the lamp 100. The opposing section 103 is installed on the holder body 102 using screws or the like. Since the opposing section 103 is directly subjected to heat from the lamp 100, the opposing section 103 is formed from highly heat resistive resins such as PPS and LCP. In addition, on the opposite surface (upper surface in FIG. 10(a)) of the opposing section 103 with respect to the lamp 100, a handle-attached lamp-lid 21 that can be held by the worker with his/her hand when replacing the lamp unit 20 is provided as a separate component. The handle-attached lamp-lid 21 forms one portion of the exterior surface of the projector. The handle-attached lamp-lid 21 is formed from resins having low thermal conductivity such as PC+ABS, so as to allow the worker to hold the handle-attached lamp-lid 21 directly with his/her hand even immediately after the set (lamp turned on) has been used. In addition, a heat shield plate 202 formed from sheet metals and the like such as aluminum is disposed between the holder body 102 and the handle-attached lamp-lid 21, and heat from the lamp 100 is blocked by the heat shield plate 202.

As shown in FIG. 11(a), the two datum pins 111 are disposed on the illumination optical system 30 for restricting positions of the illumination optical system 30 and the lamp unit 20. By fitting the two datum pins 111 in the two datum holes 112 on the lamp unit 20 side, the position of the lamp unit 20 with respect to the illumination optical system 30 is determined. The illumination optical system 30 and the lamp unit 20 are fixed with respect to each other using screws.

In order to smoothly fit the two datum pins 111 of the illumination optical system 30 in the two datum holes 112 of the lamp unit 20 when inserting the lamp unit 20, the two guide grooves 110 are provided on the illumination optical system 30 to assist insertion of the lamp unit 20. On the holder body 102 side of the lamp unit 20, the two guide ribs 109 are disposed at positions corresponding to the guide grooves 110. As a result of the guide ribs 109 fitting in the respective guide grooves 110, the lamp unit 20 can be smoothly installed or removed.

On the opposite surface side of the handle-attached lamp-lid 21, three or more of the protruding sections 107 are disposed on the holder body 102 or the lamp opposing section 103. Two of the protruding sections 107 on the holder body 102 form the front side support section 251. One of the protruding sections 107 on the tip surface of the plate section 253 forms the back side support section 252 together with the plate section 253. These protruding sections 107 are each inserted in the protruding-section recesses 114 of the lamp housing 300. Therefore, each of the protruding sections 107 is unlikely to be directly subjected to heat from the lamp 100. The tip of each of the protruding sections 107 is tapered so as to be thin, and an area of the tip surface is small. In addition, the tips of these protruding sections 107 are on the same plane. Therefore, when the protruding sections 107 are pointed downward, the lamp unit 20 can be supported in a well-balanced manner.

Furthermore, when the lamp unit 20 is large and there is a concern that the lamp unit 20 screwed on the illumination optical system 30 may topple, it is also possible to use one of the protruding sections 107 on the holder body 102 as the toppling prevention datum pin 115, and use one of the protruding-section recesses 114 on the illumination optical system 30 side as the toppling prevention datum hole 116. With this, toppling of the lamp unit 20 is suppressed.

With the above described configuration, when replacing the lamp unit 20, it is possible to hold the handle section 108 of the handle-attached lamp-lid 21, take out the lamp unit 20, and, while holding the handle section 108, place the lamp unit 20 on a desk or the like such that the opposite surface side of the handle section 108 faces downward.

Sixth Embodiment

Since components included in a projector in a sixth embodiment are same as the components in the first embodiment, detailed descriptions thereof are omitted.

Figure 12:
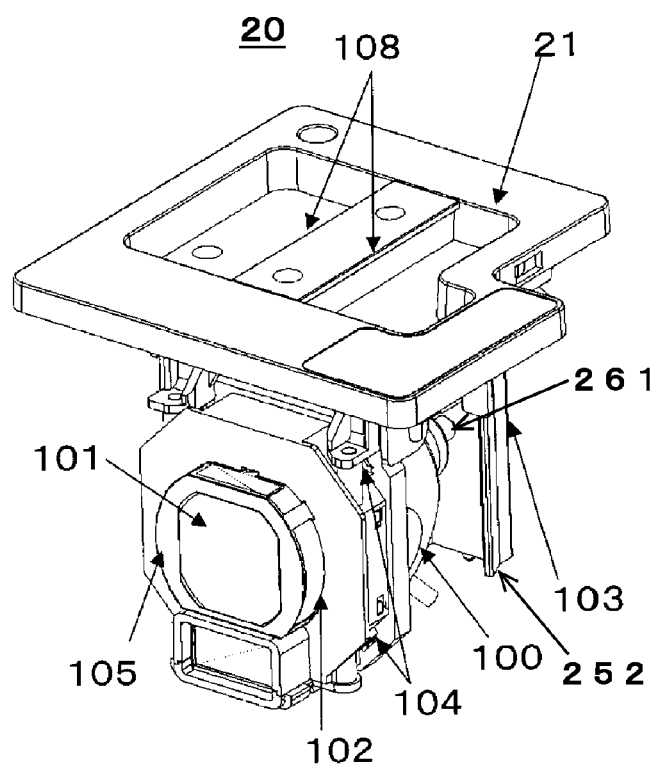
FIG. 12 is a schematic structural diagram of a lamp unit integrally formed with a lamp lid according to a sixth embodiment which is one aspect of the present invention.
Figure 12:
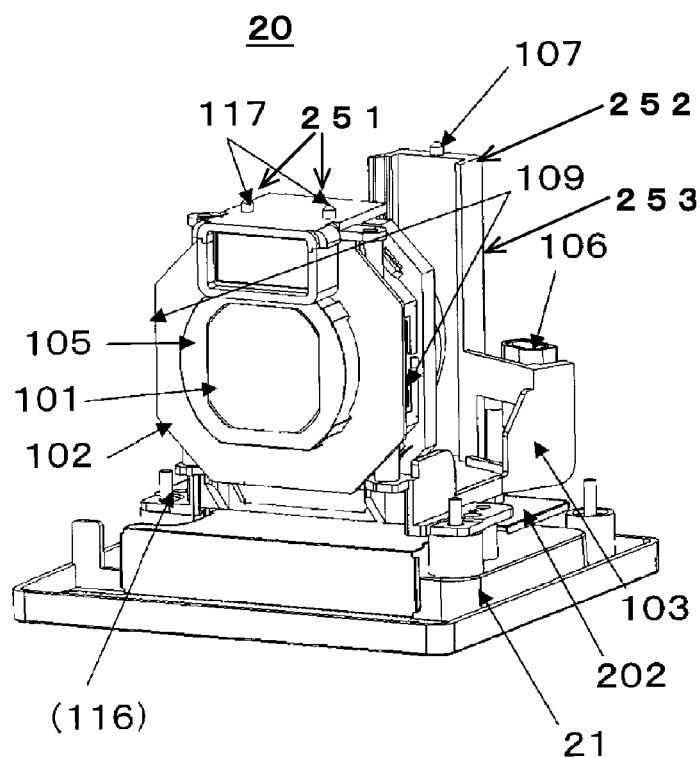
Figure 13:
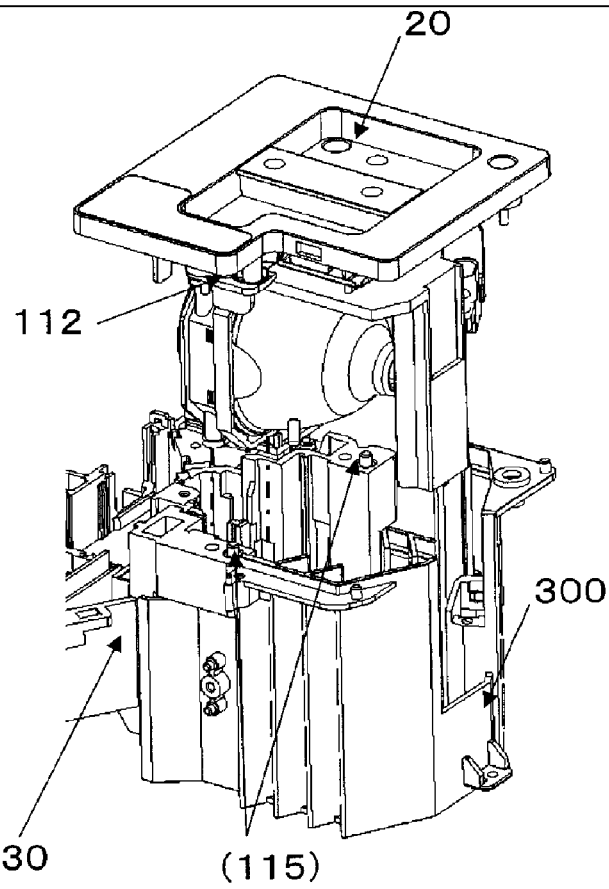
FIG. 13 is a schematic structural diagram regarding installation of the lamp unit integrally formed with the lamp lid according to the sixth embodiment which is one aspect of the present invention.
Figure 13:
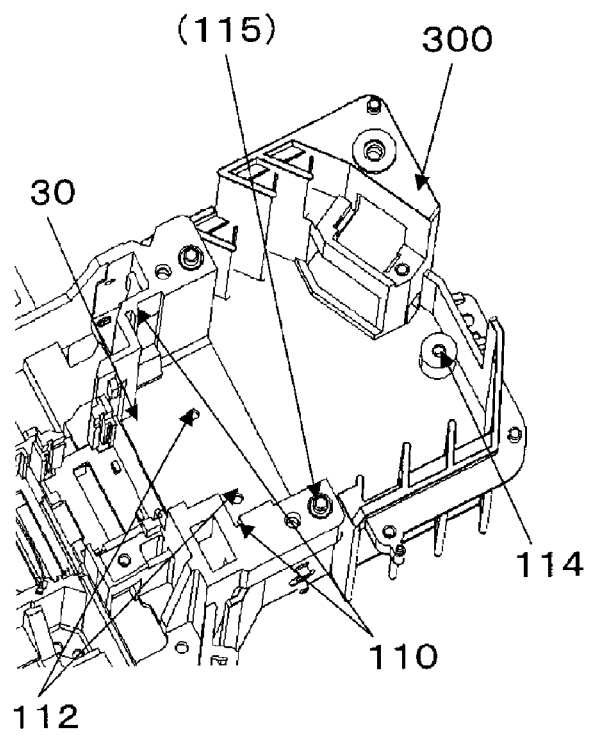

FIG. 12 is a schematic structural diagram of the lamp unit 20 according to the sixth embodiment. (a) of the same figure is a perspective diagram viewing the lamp unit 20 from the handle section 108 side, and (b) of the same figure is an upside down perspective diagram of that of (a) of the same figure. FIG. 13 is a schematic structural diagram regarding installation of the lamp unit 20 according to the sixth embodiment. (a) of the same figure is a perspective diagram viewing the lamp housing 300 from above, and (b) of the same figure is an inner perspective diagram of the lamp housing 300 when the lamp unit is taken out.

The lamp unit 20 and the illumination optical system 30 are structured so as to be separable from each other. When the lifespan of the lamp elapses, the worker can take out the lamp unit 20 to replace the lamp unit 20. A main body side of the lamp unit 20 is housed inside the lamp housing 300. The lamp housing 300 blocks light from the lamp 100 and blocks heat generated by the lamp 100.

The lamp unit 20 includes the lamp 100, the light condensing lens 101, the lamp holder 102/103, the handle section 108, and the support section 251/252. The lamp 100 and the light condensing lens 101 are held by the holder body 102 of the lamp holder 102/103. Since the holder body 102 is subjected to heat from the lamp 100, the holder body 102 is formed using highly heat resistive resins such as PPS and LCP, and metallic materials such as aluminum die-casts having fine thermal conduction. In order to hold the lamp 100, the holder body 102 is pressed against the lamp 100 at four corners by the lamp springs 104 which are metallic components such as spring materials, so as to have the lamp 100 installed. Furthermore, the light condensing lens 101 is installed on the holder body 102 from an opposite side of the lamp 100. The light condensing lens 101 is pressed against the holder body 102 so as to be installed thereon by the lens spring 105 which is a metallic component such as a spring material similar to the lamp springs 104. The opposing section 103 of the lamp holder 102/103 blocks heat from the lamp 100. In addition, the opposing section 103 holds the socket 106 that supplies power to the lamp 100. The opposing section 103 is installed on the holder body 102 using screws or the like. Since the opposing section 103 is directly subjected to heat from the lamp 100, the opposing section 103 is formed from highly heat resistive resins such as PPS and LCP.

In addition, on the opposite side surface (upper surface in FIG. 12(a)) of the lamp opposing section 103 with respect to the lamp 100, the handle-attached lamp-lid 21 that can be held by the worker with his/her hand when replacing the lamp unit 20 is provided as a separate component. The handle-attached lamp-lid 21 forms one portion of the exterior surface of the projector. The handle-attached lamp-lid 21 is formed from resins having low thermal conductivity such as PC+ABS, so as to allow the worker to hold the handle-attached lamp-lid 21 directly with his/her hand even immediately after the set (lamp turned on) has been used. In addition, the heat shield plate 202 formed from sheet metals and the like such as aluminum is disposed between the holder body 102 and the handle-attached lamp-lid 21, and heat from the lamp 100 is blocked by the heat shield plate 202.

On the opposite surface side with respect to the handle-attached lamp-lid 21, two protruding section-and-datum pins 117 are disposed on the holder body 102, and one protruding section 107 is disposed on the opposing section 103. The two protruding section-and-datum pins 117 and the one protruding section 107 form the support section 251/252 similarly to the second embodiment. Unlike in the fifth embodiment, in the sixth embodiment, as shown in FIG. 13 (a), the two protruding section-and-datum pins 117 of the holder body 102 are used to restrict the positions of the illumination optical system 30 and the lamp unit 20. By providing, on the illumination optical system 30 side, the two datum holes 112 in which the two protruding section-and-datum pins 117 are to be inserted, the position of the lamp unit 20 with respect to the illumination optical system 30 can be determined. The one protruding section 107 on the opposing section 103 side is inserted in the protruding-section recess 114 formed on the bottom surface of the lamp housing 300. The two protruding section-and-datum pins 117 and the one protruding section 107 are unlikely to be directly subjected to heat from the lamp 100. Furthermore, tips of the protruding section-and-datum pins 117 and a tip of the protruding section 107 are tapered so as to be thin, and areas of the tip surfaces are small. In addition, the tips of the protruding section-and-datum pins 117 and the tip of the protruding section 107 are on the same plane. Therefore, the tips of the protruding section-and-datum pins 117 and the protruding section 107, when they are pointed downward, can support the lamp unit 20 in a well-balanced manner.

Furthermore, when the lamp unit 20 is large and there is a concern that the lamp unit 20 screwed on the illumination optical system 30 may topple, it is also possible to provide the toppling prevention datum hole 116 on the handle section 108 side of the holder body 102, and fit the toppling prevention datum pin 115 on the illumination optical system 30 side in the toppling prevention datum hole 116. With this, toppling of the lamp unit 20 is suppressed.

In order to smoothly fit the two datum pins 111 of the illumination optical system 30 in the two datum holes 112 of the lamp unit 20 when inserting the lamp unit 20, the two guide grooves 110 are provided on the illumination optical system 30 to assist insertion of the lamp unit 20. As a result of the two guide ribs 109 disposed on the holder body 102 side of the lamp unit 20 fitting in the two guide grooves 110, the lamp unit 20 can be smoothly installed or removed.

With the above described configuration, when replacing the lamp unit 20, it is possible to hold the handle section 108 of the handle-attached lamp-lid 21, take out the lamp unit 20, and, while holding the handle section 108, place the lamp unit 20 on a desk or the like such that the opposite surface side of the handle section 108 faces downward.

Seventh Embodiment

Since components included in a projector in a seventh embodiment are same as the components in the first embodiment, detailed descriptions thereof are omitted.

Figure 14:
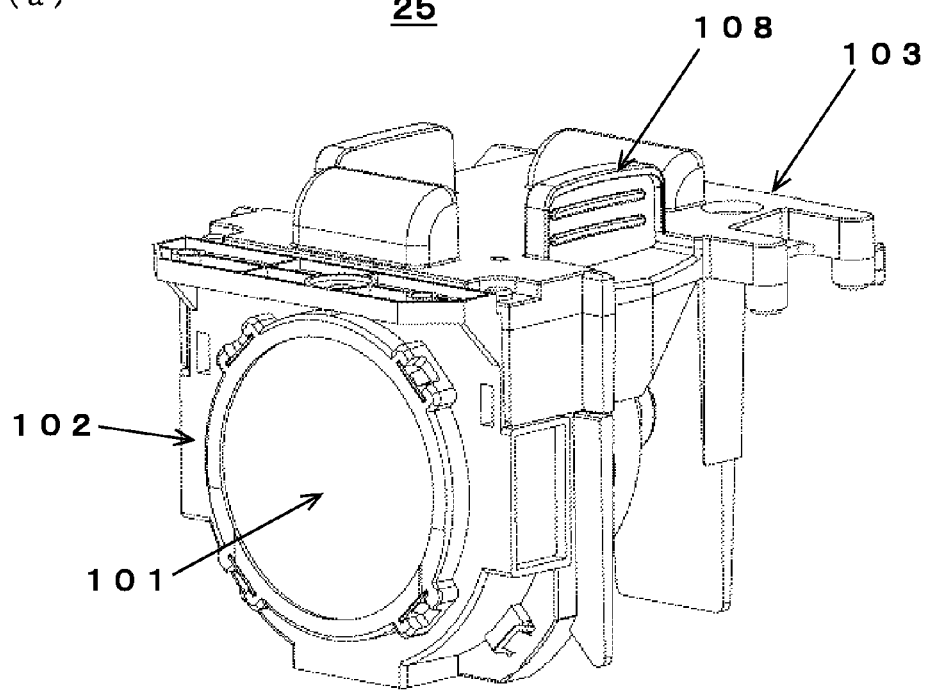
FIG. 14 is a schematic structural diagram of a lamp unit according to a seventh embodiment which is one aspect of the present invention.
Figure 14:
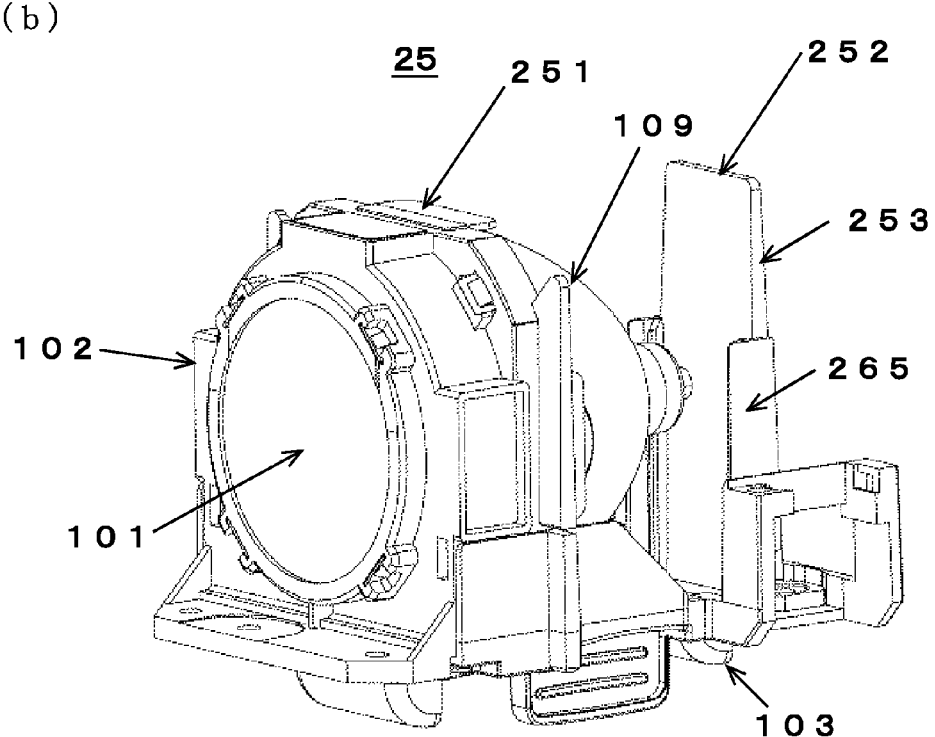

FIG. 14 is a schematic structural diagram of a lamp unit 25 according to the seventh embodiment. (a) of the same figure is a perspective diagram viewing the lamp unit 25 from the handle section 108 side, and (b) of the same figure is an upside down perspective diagram of that of (a) of the same figure.

In the lamp unit 25, the configuration of the support section 251/252 is different from those of the first to the sixth embodiments. Other than the support section 251/252, although shapes of members are slightly different, the lamp unit 25 has a configuration nearly identical the lamp unit 10 of the first embodiment. The front side support section 251 is formed by a rectangular end surface (bottom end surface in FIG. 14(a)) on the opposite side of the handle section 108 of the holder body 102 of the lamp holder 102/103. Unlike the first to the sixth embodiments, the front side support section 251 only protrudes slightly from the holder body 102. On the other hand, the back side support section 252 does not have a protruding section unlike that of the first to the sixth embodiments, and supports the lamp unit 25 at a tip of the plate section 253.

With the above described configuration, when replacing the lamp unit 25, it is possible to hold the handle section 108 of the opposing section 103, take out the lamp unit 25, and, while holding the handle section 108, place the lamp unit 25 on a desk or the like such that the opposite surface side of the handle section 108 faces downward.

Eighth Embodiment

Since components included in a projector in an eighth embodiment are same as the components in the first embodiment, detailed descriptions thereof are omitted.

Figure 15:
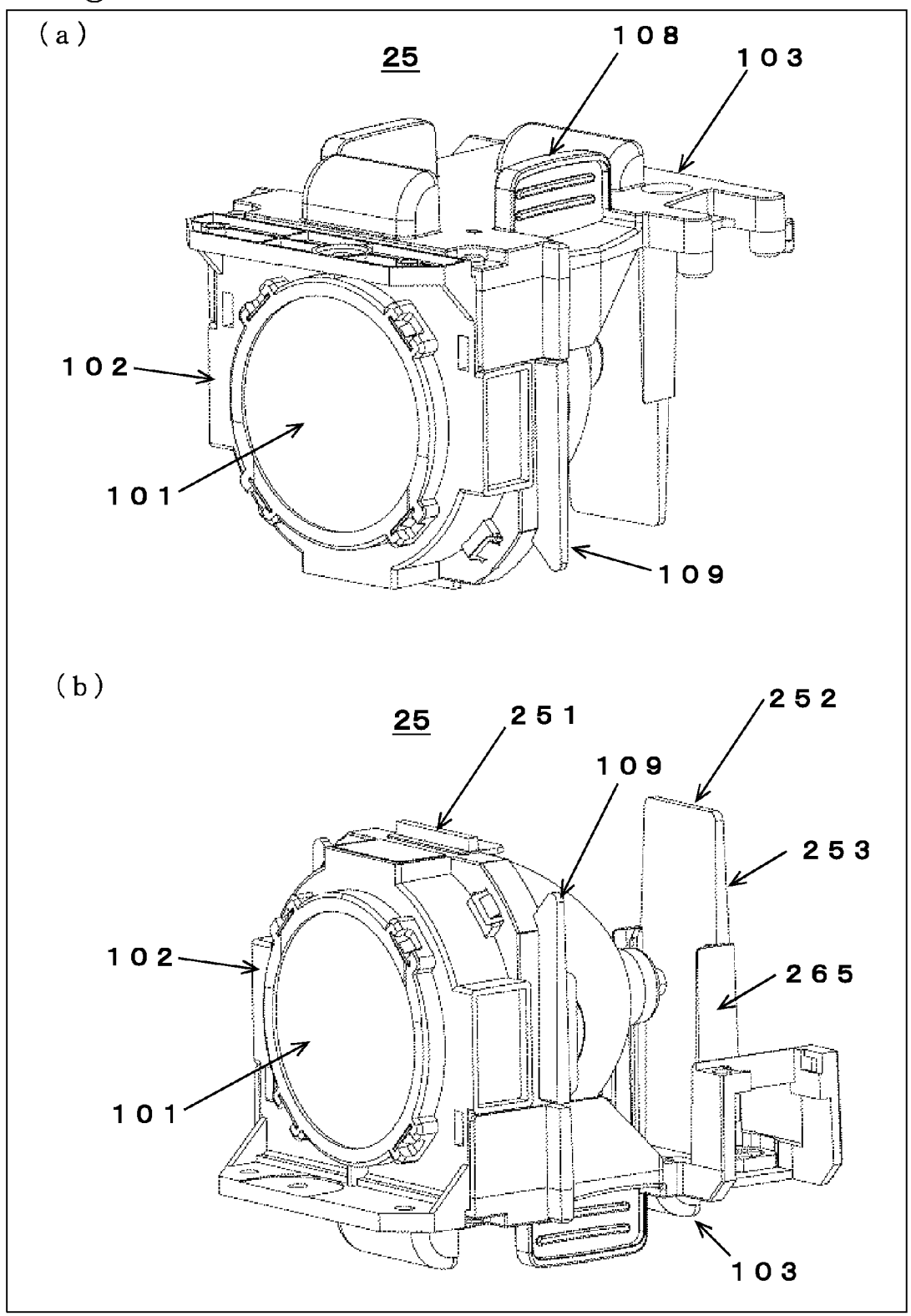
FIG. 15 is a schematic structural diagram of a lamp unit according to an eighth embodiment which is one aspect of the present invention.

FIG. 15 is a schematic structural diagram of the lamp unit 25 according to the eighth embodiment. (a) of the same figure is a perspective diagram viewing the lamp unit 25 from the handle section 108 side, and (b) of the same figure is an upside down perspective diagram of that of (a) of the same figure.

In this lamp unit 25, the configuration of the front side support section 251 is different from that of the seventh embodiment. The front side support section 251 is formed by a long and thin projected part that protrudes from a rectangular end surface (top end surface in FIG. 15(b)) on the opposite side of the handle section 108 of the holder body 102 of the lamp holder 102/103. On the other hand, similarly to the seventh embodiment, the back side support section 252 does not have a protruding section, and supports the lamp unit 25 at the tip of the plate section 253.

With the above described configuration, when replacing the lamp unit 25, it is possible to hold the handle section 108 of the opposing section 103, take out the lamp unit 25, and, while holding the handle section 108, place the lamp unit 25 on a desk or the like such that the opposite surface side of the handle section 108 faces downward.

It should be noted that the present invention is not limit to the above described first to sixth embodiments, and modification and improvements that can achieve the objective of the present invention are included in the present invention.

Although the projector according to the first to sixth embodiments is formed with a liquid crystal projector including three transmission-type liquid crystal panels, the projector may include one, two, four, or more liquid crystal panels, or the projector may include a reflection-type liquid crystal panel.

Furthermore, although a liquid crystal panel is used as the image formation device, an image formation device using a micro mirror device (DMD) may also be used.

Furthermore, in the first to eighth embodiments, the front side support section 251 and the back side support section 252 may be connected to each other at the bottom end when the projector unit is placed down on a surface. For example, in the seventh embodiment, support surfaces of the support section 251/252 become frame-like.

Furthermore, in the first to eighth embodiment, although the lamp unit includes the light condensing lens 101, the light condensing lens 101 may be disposed on the lamp housing 300.

The configuration of the lamp unit according to the embodiments described herein can be used as a lamp unit and the like that enables a worker to replace a lamp even immediately after when the lamp has burnt out and is hot at the time of lamp replacement. In addition, when multiple lamps are used in a set, the configuration can be used as a lamp unit and the like that enables lamp replacement without terminating the supply of power to the set when one of the lamps is in use.

What is claimed is:

1. A lamp unit detachably disposed on a projector, the lamp unit comprising:
    a lamp configured to function as a light source of the projector;
    a lamp holder configured to hold the lamp;
    a handle section disposed on the lamp holder and used when removing the lamp unit from the projector; and
    a support section used for placing down the lamp unit removed from the projector on a surface and configured to support the lamp unit from below, wherein
    the support section includes a front side support section configured to support the lamp unit at a front side of the lamp unit, and a back side support section disposed behind the lamp and configured to support the lamp unit at a tip located outside an outer circumference of the lamp when the lamp unit is viewed from the front.

2. The lamp unit according to claim 1, wherein the back side support section is disposed so as to shield a site having an installation hole for a bulb of the lamp.

3. The lamp unit according to claim 1, wherein the support section is configured to support the lamp unit using three or more protruding sections.

4. The lamp unit according to claim 1, wherein the handle section is detachable and reattachable with respect to the lamp holder.

5. The lamp unit according to claim 1, further comprising a lamp lid that is fixed on the lamp holder and that forms one portion of an exterior surface of the projector in a state where the lamp unit is installed in the projector, wherein
the handle section is fixed or formed on the lamp lid.

6. The lamp unit according to claim 1, wherein the lamp holder includes a holder body configured to hold the lamp and formed from a heat-resistant resin or a metallic material, and an opposing section formed from a heat-resistant resin, extending backward from the holder body and opposing an outer circumferential surface of the lamp.

7. The lamp unit according to claim 1, wherein
the support section is configured to support the lamp unit using three or more protruding sections, and
at least one of the protruding sections disposed on a holder body of the lamp holder is configured to function as a datum pin that is to be inserted in a datum hole disposed on an installation position of the lamp unit of the projector.

* * * * *